US010093568B2

(12) United States Patent
Chen et al.

(10) Patent No.: US 10,093,568 B2
(45) Date of Patent: Oct. 9, 2018

(54) METHOD FOR WASTEWATER TREATMENT BY URINE SEPARATION, SEAWATER ADDITION, AND NITRIFICATION AND IN-SEWER DENITRIFICATION

(75) Inventors: Guanghao Chen, Hong Kong (CN); Hamish Robert Mackey, Hong Kong (CN); Feng Jiang, Guangdong (CN); Ho Kwong Chui, Hong Kong (CN)

(73) Assignee: THE HONG KONG UNIVERSITY OF SCIENCE AND TECHNOLOGY, Kowloon, Hong Kong (CN)

( * ) Notice: Subject to any disclaimer, the term of this patent is extended or adjusted under 35 U.S.C. 154(b) by 531 days.

(21) Appl. No.: 14/123,151

(22) PCT Filed: May 28, 2012

(86) PCT No.: PCT/CN2012/000736
§ 371 (c)(1),
(2), (4) Date: Nov. 29, 2013

(87) PCT Pub. No.: WO2012/163085
PCT Pub. Date: Dec. 6, 2012

(65) Prior Publication Data
US 2014/0116939 A1    May 1, 2014

Related U.S. Application Data

(60) Provisional application No. 61/457,775, filed on Jun. 1, 2011.

(51) Int. Cl.
*C02F 9/00*     (2006.01)
*C02F 3/02*     (2006.01)
(Continued)

(52) U.S. Cl.
CPC .............. *C02F 3/02* (2013.01); *C02F 1/5263* (2013.01); *C02F 3/308* (2013.01); *C02F 3/342* (2013.01);
(Continued)

(58) Field of Classification Search
CPC .......... C02F 3/02; C02F 1/5263; C02F 3/308; C02F 3/342; C02F 2103/005;
(Continued)

(56) References Cited

U.S. PATENT DOCUMENTS 6,183,642 B1    2/2001  Heijnen et al.
6,383,390 B1    5/2002  Van Loosdrecht et al.
(Continued)

FOREIGN PATENT DOCUMENTS

CN         1056475 A    11/1991
CN         1705618 A    12/2005
(Continued)

OTHER PUBLICATIONS

Udert, "The Fate of Nitrogen and Phosphorus in Source-Separated Urine," dissertation submitted to the Swiss Federal Institute of Technology Zurich, 2002, pp. 1-130.*
(Continued)

*Primary Examiner* — Claire A Norris
(74) *Attorney, Agent, or Firm* — Nath, Goldberg & Meyer; Jerald L. Meyer; Stanley N. Protigal

(57) ABSTRACT

A method for wastewater treatment which comprises (a) separating and/or collecting urine from the wastewater for pretreatment, (b) removing phosphorus from urine using seawater, (c) optionally oxidizing nitrogen from urine, and (d) discharging the phosphorus-removed and/or nitrogen-oxidized urine to a sewer.

12 Claims, 5 Drawing Sheets

(51) Int. Cl.
*C02F 3/30* (2006.01)
*C02F 1/52* (2006.01)
*C02F 3/34* (2006.01)
*C02F 103/00* (2006.01)
*C02F 103/08* (2006.01)

(52) U.S. Cl.
CPC .... *C02F 2103/005* (2013.01); *C02F 2103/08* (2013.01); *C02F 2209/06* (2013.01); *C02F 2307/08* (2013.01)

(58) Field of Classification Search
CPC .............. C02F 2103/08; C02F 2209/06; C02F 2307/08; C02F 2101/105; Y10S 210/906; B82Y 30/00
USPC .................................................. 210/631, 906
See application file for complete search history.

(56) References Cited

U.S. PATENT DOCUMENTS

| | | |
|---|---|---|
| 7,005,072 B2 | 2/2006 | Bowers et al. |
| 7,273,553 B2 | 9/2007 | Van Loosdrecht et al. |
| 7,404,897 B2 | 7/2008 | Bailey, Jr. et al. |

FOREIGN PATENT DOCUMENTS

| | | |
|---|---|---|
| CN | 1894167 A | 10/2007 |
| CN | 101298324 A | 11/2008 |
| CN | 101486501 A | 7/2009 |
| EP | 0327184 A1 | 8/1989 |
| EP | 1012121 A1 | 6/2000 |
| JP | 10-249359 A | 9/1998 |
| WO | 9951522 A1 | 10/1999 |

OTHER PUBLICATIONS

Maurer et al, "Treatment processes for source-separated urine" Water Research 40, 2006, pp. 3151-3166.*
Thoren, "Urea Transformation of Wetland Microbial Communities" Microbial Ecology, 2007, pp. 221-232.*
Ekama, et al. "Saline sewage treatment and source separation of urine for more sustainable urban water management", Water Science & Technology, 64.6, 2011.
Kumashiro, et al. "A pilot plant study on using seawater as a magnesium source for struvite precipitation", 2001.
Mackey, et al. "Phosphorus recovery from source-separated urine using seawater from seawater toilet flushing system in Hong Kong", 2011.
Mackey, et al. "Development of nitrifying granular sludge for urine treatment in a novel decentralised BNR system", International Water Association.
Jiang, et al. "Urine nitrification and sewer discharge to realize in-sewer denitrification to simplify sewage treatment in Hong Kong", Water Science * Technology, 64.3, 2011.
Mackey et al. "Development of nitrifying granular sludge for treating phosphorus-deficient urine-seawater mixture" IWA Conferences Manuscript.
Mackey et al. "Phosphorus recovery from source-separated urine using seawater from seawater toilet flushing system in Hong Kong", Powerpoint presentation, IWA Leading Edge Technologies, 2011.
Berndtsson, J.C. (2006). Experiences from the implementation of a urine separation system: Goals, planning, reality. Building and Technology, 41, 427-437.
Cordell, D., Drangert, J.-O., White, S. (2009) The story of phosphorus: global food security and food for thought. Global Environmental Change, 19, 292-305.
Déry, P., Anderson, B. (2007) Peak phosphorus. Energy Bulletin Aug. 13.
Fittschen, I., and Hahn, H.H. (1998) Characterization of the municipal wastewater part human urine and a preliminary comparison with liquid cattle excretion. Water Science and Technology, 38(6), 9-16.
Hanæus, J., Hellstrom, D., Johansson, E. (1997). A study of a urine separation system in an ecological village in northern Sweden. Water Science and Technology, 35(9), 153-160.
Hellström, D., Johansson, E., and Grennberg, K. (1999) Storage of human urine: Acidification as a method to inhibit decomposition of urea. Ecological Engineering, 12(3-4), 253-269.
Jönsson, K (2001). Urine separation—Swedish experiences, in EcoEng Newsletter, Issue 1, International Ecological Engineering Society, Wolhusen, Switzerland.
Jönsson, H., Stenström, T.-A., Svensson, J., and Sundin, A. (1997) Source separated urine-nutrient and heavy metal content, water saving and faecal contamination. Water Science and Technology, 35(9), 145-152.
Lienert, J., Bürki, T., and Escher, B.I. (2007) Reducing micropollutants with source control: Substance flow analysis of 212 pharmaceuticals in faeces and urine. Water Science and Technology, 56(5), 87-96.
Ronteltap, M., Maurer, M., and Gujer, W. (2007) The behaviour of pharmaceuticals and heavy metals during struvite precipitation in urine. Water Research, 41(9), 1859-1868.
US Geological Survey (2010) USGS 2010 Mineral commodity summaries. Digital Data Series DDS-37. http://minerals.usgs.gov/minerals/pubs/mcs/ (accessed Mar. 12, 2011).
Van Vuuren, D.P., Bouwman, A.F., Beusen, A.H.W. (2010) Phosphorus demand for the 1970-2100 period: A scenario analysis of resource depletion. Global Environmental Change, 20, 428-439.
Garcia C., Hernández T. (1996) Influence of salinity on the biological and biochemical activity of a calciorthird soil. Plant and Soil, 178(2), 255-263.
Larsen T.A., Gujer W. (1996) Separate management of anthropogenic nutrient solutions (human urine). Water Science and Technology, 34(3-4), 87-94.
Srivastava P., Bhattacharyya T., Pal D.K. (2002) Significance of the formation of calcium carbonate minerals in the pedogenesis and management of cracking clay soils (vertisols) of India. Clays and Clay Minerals, 50(1), 111-126.
International Search Report dated Sep. 6, 2012, of counterpart international application PCT/CN2012/000736.

* cited by examiner

METHOD FOR WASTEWATER TREATMENT BY URINE SEPARATION, SEAWATER ADDITION, AND NITRIFICATION AND IN-SEWER DENITRIFICATION

This is a National Phase Application filed under 35 U.S.C. 371 as a national stage of PCT/CN2012/000736, filed May 28, 2012, an application claiming the benefit under 35 USC 119(e) U.S. from Provisional Patent Application No. 61/457,775, filed Jun. 1, 2011, the content of each of which is hereby incorporated by reference in its entirety.

FIELD OF THE INVENTION

The present subject matter relates to a method for wastewater treatment. In particular, the present subject matter relates to a method for wastewater treatment comprising recovering nutrients, i.e., phosphorus, from urine and removing nutrients, i.e., nitrogen, from wastewater.

BACKGROUND OF THE INVENTION

Phosphorus and nitrogen are nutrients which can cause eutrophication and algal bloom, if they are discharged to sensitive waters in large amounts. On the other hand, phosphorus is essential to all living organisms. It is obtained almost exclusively from mined phosphate rock (USGS, 2010; van Vuuren et al., 2010, see the References). Predictions vary, but it is commonly believed that 35-100% of the current estimated phosphorus reserves will be depleted by the end of the century (Dery and Anderson, 2007, van Vuuren et al., 210). The crucial role of phosphate for food production makes phosphorus recovery a high priority.

The conventional method to remove phosphorus and nitrogen is to adopt a biological nitrogen and phosphorus removal process in the biological sewage treatment works, such as the 5-stage Bardenpho Process, as shown in FIG. 1. In this process, nitrogen is removed through autotrophic nitrification followed by heterotrophic denitrification. The nitrification step requires a large amount of oxygen and a large reactor, because the nitrifiers are slow growing bacteria. Denitrification is then conducted by converting organic carbon to carbon dioxide and nitrate to nitrogen gas. Phosphorus removal is conducted through luxury intake by means of the addition of an anaerobic zone at the beginning of the sewage treatment plant. Phosphorus harvesting was then conducted by controlled struvite (Magnesium Ammonium Phosphate, or MAP) precipitation from the anaerobic sludge digester supernatant or by sludge incineration. Overall, the biological nutrient removal process requires a large land footprint to cater for the slow growth bacteria.

Urine represents roughly 1% of the bulk sewage liquid volume (Maurer et al., 2006) but represents approximately 80% of the total nitrogen load and 50-80% of the total phosphorus load in the bulk sewage volume (Fittschen and Hahn, 1998). Since this phosphorus stream comprises roughly 5% of mined phosphorus loads (Cordell et al., 2009; van Vuuren e al., 2010), source separation of urine provides a significant opportunity for phosphorus recovery.

Urine separation has been studied and implemented in an urban environment since the 1990s in some European countries, such as Sweden and Denmark (Hanöus et al., 1997; Jönsson et al., 1997) with over 3000 systems installed in Sweden by 1999 (Hellström and Johansson, 1999). Urine separation is accomplished through a specially designed NoMix toilet bowl with a small compartment at the front designed to collect urine and by urinals in male toilets. They are currently available on the market and are made by a number of manufacturers. Studies in Northern Europe have shown that NoMix technology is generally well accepted by users in numerous surveys (Berndtsson, 2006; Lienert et al., 2007). Although scaling and blockage has been an issue in the early development of the system, these problems are no longer of major concern (Jönsson, 2001).

Phosphorus and nitrogen from urine can be reused through direct application of urine onto agricultural lands. However, direct discharge of urine to agricultural lands causes human hygienic concerns. Moreover, as there is a high possibility of urine being contaminated by endocrine disrupters which originated from drugs taken by humans, direct reuse of urine is not truly welcomed for growing edible crops.

Phosphorus recovery can be achieved through addition of magnesium salts to urine to facilitate precipitation of magnesium ammonium phosphate (MAP) (Maurer et al., 2006). This is a solid fertilizer free from micro-pollutants and the majority of heavy metals (Ronteltap et al., 2007). This can therefore be a safer phosphorus recovery method. However, this process suffers from the need for addition of expensive magnesium salts. Thus, a low-cost alternative is needed, especially for developing countries. One readily available and low-cost source of magnesium would be seawater, which contains 1.29 g/L of magnesium.

Research has been reported regarding wastewater treatment using seawater, e.g., phosphorus recovery from digester supernatant with seawater (Kumarshiro et al., 2001; Lee et al., 2003) and phosphorus recovery from urine with bittern (Etter, 2009). However, these processes involve relatively complex chemical or biochemical processes, microorganisms and/or source of materials and relatively high cost.

U.S. Pat. No. 4,228,003 to Makino discloses removal of phosphates from wastewater by way of coagulation and sedimentation of phosphates by adding seawater. This process requires adjustment of pH and a specific ratio of phosphate-containing wastewater to seawater. However, this process requires removal of phosphorus directly from municipal sewage wastewater and no urine separation is required.

In addition, US 2008/0308505 to Jansen et al. discloses a system and a process for removal of phosphorous and ammonia from aqueous streams, U.S. Pat. No. 7,005,072 Bowers et al. discloses a method for removing phosphorus from waste lagoon effluent, U.S. Pat. No. 7,722,768 to Abma et al. discloses a process for the simultaneous removal of BOD and phosphate from waste water, U.S. Pat. No. 4,911,843 to Hunniford et al. discloses a process for removal of dissolved hydrogen sulfide and reduction of sewage BOD in sewer or other waste systems, and U.S. Pat. No. 7,404,897 to Bailey Jr. et al. discloses a method for nitrogen removal and treatment of digester reject water in wastewater using bioaugmentation. However, no report or disclosure so far has combined urine and seawater or seawater toilet flushing.

SUMMARY OF THE INVENTION

Provided herein is a cost effective and efficient method for wastewater treatment where urine separation from domestic wastewater and direct use of seawater to remove phosphorus from urine are combined. The method allows a cost effective and efficient removal of a major component of phosphorus within domestic wastewater and removal of nitrogen in a small footprint by treating a concentrated nitrogen stream and utilizing existing sewer assets for treatment rather than just transportation. Furthermore, it provides the opportunity for reuse of phosphorus for agricultural purposes.

Accordingly, in one aspect, the present subject matter relates to a method for wastewater treatment comprising: (a) separating and/or collecting urine from the wastewater for pretreatment, (b) removing phosphorus from the urine using seawater, (c) optionally oxidizing nitrogen from the urine, and (d) discharging the phosphorus-removed and/or nitrogen-oxidized urine to a sewer. In one embodiment, the oxidized nitrogen can be converted into nitrogen gas. In an embodiment, the separated and/or collected urine is preferably pretreated to hydrolyze urea to ammonia, preferably using a biological reactor, such as a biofilm reactor or a fixed biomass growth, by way of non-limiting example. In another embodiment, the pH of urine is preferably controlled by adding an alkali, such as, for example NaOH. The phosphorus in hydrolyzed urine may exist and be removed in the form of an insoluble phosphorus-containing compound.

Further, in another embodiment, seawater may be added to the separated and/or collected urine prior to the pretreatment of the urine. In a further embodiment, the nitrogen in the urine may be nitrified, preferably using a biological nitrification reactor. In a still further embodiment, the nitrified urine may be discharged to a foul sewer to mix with other wastewater for in-sewer denitrification and organic carbon removal.

BRIEF DESCRIPTION OF DRAWINGS

Various embodiments will now be described in detail with reference to the accompanying drawings.

DETAILED DESCRIPTION

Figure 1:
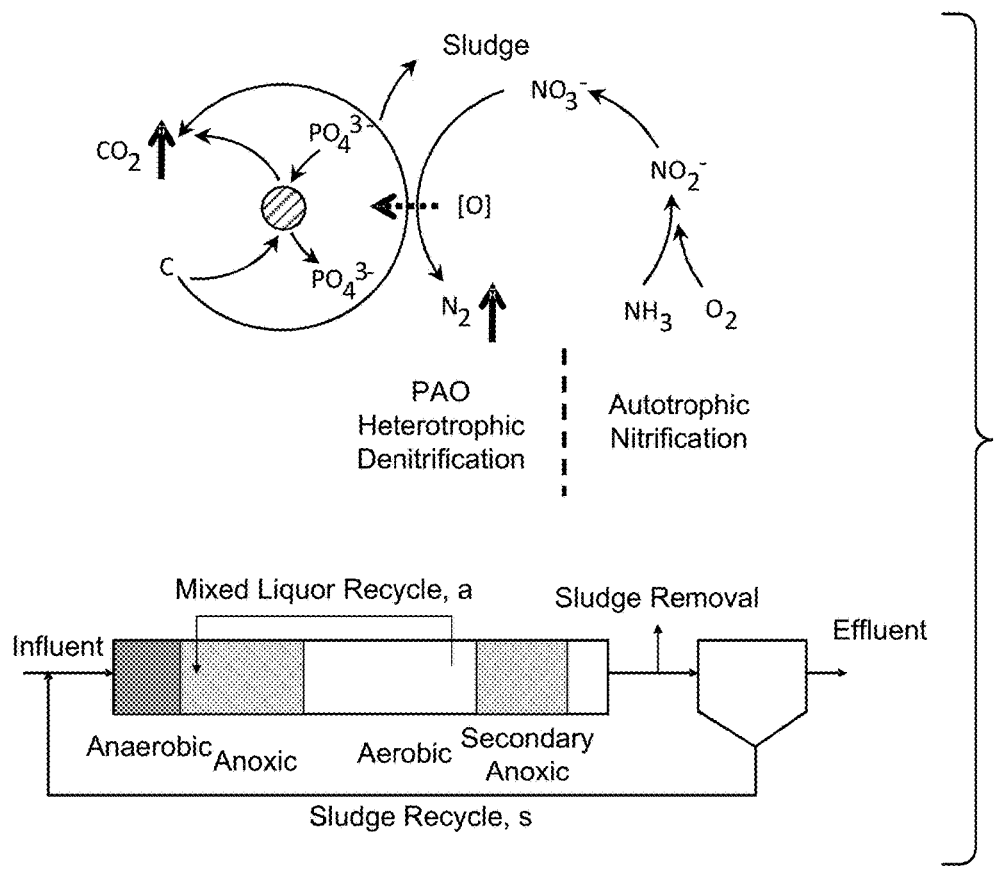
FIG. 1 illustrates prior art of a conventional biological nitrogen and phosphorus removal process.

Unless defined otherwise all technical and scientific terms used herein have the same meaning as commonly understood to one of ordinary skill in the art to which the present subject matter pertains.

It is noted that, as used in this specification and the appended claims, the singular forms "a," "an" and "the" include plural references unless the context clearly dictates otherwise.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Further, where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language; however, it will be understood by one of skill in the art, that in some specific instances, an embodiment can alternatively be described using the language "consisting essentially of" or "consisting of."

In one aspect, the present subject matter relates to a method for wastewater treatment, comprising: (a) separating and/or collecting urine from the wastewater for pretreatment, (b) removing phosphorus from the urine using seawater, (c) optionally oxidizing ammonia nitrogen from the urine, and (d) discharging the phosphorus-removed and/or nitrogen-oxidized urine to a sewer. In one embodiment, the oxidized nitrogen can be converted into nitrogen gas. Since urine provides up to 80% nitrogen loading and 50-80% phosphorus loading of domestic sewage, it is therefore very cost-effective and space-efficient to recover phosphorus and remove nitrogen directly from urine before urine goes to the sewer and mixes with other wastewater. Accordingly, a characteristic feature of the present subject matter is to directly use seawater as a resource for recovering phosphorus from urine, optionally followed by a separate nitrogen removal from the urine. Another characteristic feature of the present subject matter may be that the urine phosphorus removal/recovery process by adding seawater can be conducted either after or prior to the pretreatment of urine by hydrolysis, followed by an optional addition of urine nitrification and in-sewer denitrification.

Urine Separation

Urine separation can be conducted using the systems or methods known in the art. Many countries have their own system for collecting urine. For example, over 3000 systems of urine separation were installed in Sweden by 1999. Also, urine separation may be accomplished through a specially designed NoMix toilet bowl with a small compartment at the front designed to collect urine and by urinals in male toilets. They are currently available on the market and are made by a number of manufacturers.

Urine Phosphorus Recovery Using Seawater

In an embodiment of the present subject matter, separated and/or collected urine is hydrolyzed to form ammonia. Human urine typically contains a large amount of urea, $(NH_2)_2CO$. In the presence of urease, an enzyme produced by various bacteria, urea can be easily hydrolyzed into ammonia, according to the equation: $(NH_2)_2CO+ 2H_2O \rightarrow HCO_3^- +NH_4^+ +NH_3$. On the other hand, seawater contains 1.29 g/L of magnesium. When hydrolyzed urine is mixed with seawater, a magnesium ammonium phosphate (MAP) precipitate can be formed.

Hydrolysis of urea may be conducted by biological urine hydrolysis. That is, the hydrolysis of urea can be accelerated by means of a properly designed biological reactor, e.g. an attached biofilm reactor, or an attached biomass producing urease, which can greatly shorten the hydraulic retention time required for hydrolysis. Separate from the biological urine hydrolysis, controlling the pH of urine by adding an alkali, such as, for example, sodium hydroxide (NaOH) can also assist urine phosphorus recovery with seawater, although the recovery rate only achieves about 80%.

In an embodiment of the present subject matter, the phosphorus removal is preferably achieved by allowing rapid hydrolysis of urine to the required degree (corresponding to a pH of about 8.9). This can be enhanced, for example, by a fixed biofilm hydrolysis chamber on a struvite precipitation reactor. This is then collected at the bottom of a hopper while the phosphorus deficient urine passes on as effluent. Accordingly, seawater is used in this embodiment as both the flushing agent and magnesium source. The inclusion of a biological fixed growth reactor prior to the struvite reactor is to encourage hydrolysis of urea and precipitation of MAP.

Figure 2:
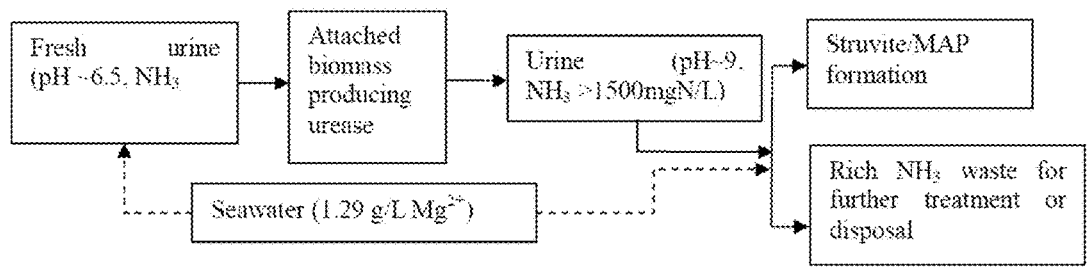
FIG. 2 illustrates a schematic design of the urine phosphorus recovery process according to one embodiment of the present subject matter.

In an embodiment of the present subject matter, seawater may be added after the hydrolysis of urine. In another embodiment of the present subject matter, seawater may be added prior to the hydrolysis of urine. In Hong Kong, for example, where a seawater toilet flushing system is used, seawater is added before the hydrolysis of urine. For other places where freshwater is used for toilet flushing, in other words seawater toilet flushing does not exist, seawater can be added after the hydrolysis step. In either system, stable MAP precipitate is formed with phosphorus recovery efficiency of up to 98% from urine. The schematic design of the two processes is shown in FIG. 2.

Urine Nitrification and In-Sewer Denitrification

In an embodiment of the present subject matter, the urine nitrification and in-sewer denitrification processes may be conducted after the phosphorus removal/recovery process. It is more cost effective to conduct such a urine nitrification process and in-sewer denitrification than discharging the hydrolyzed urine back to the sewer for nitrification and denitrification in the conventional biological sewage treatment works. This process may be preferably carried out by simply adding a small aerated biological reactor for conducting urine nitrification. The reactor is operated in batch mode with alkalinity dosing to achieve full nitrification. After nitrification is complete, the effluent can be discharged to the foul sewers and mixed with other sewage, which contains an abundant amount of readily biodegradable organic carbon and possibly sulfide. The nitrified urine is discharged to the sewer to achieve in sewer denitrification.

Figure 3:
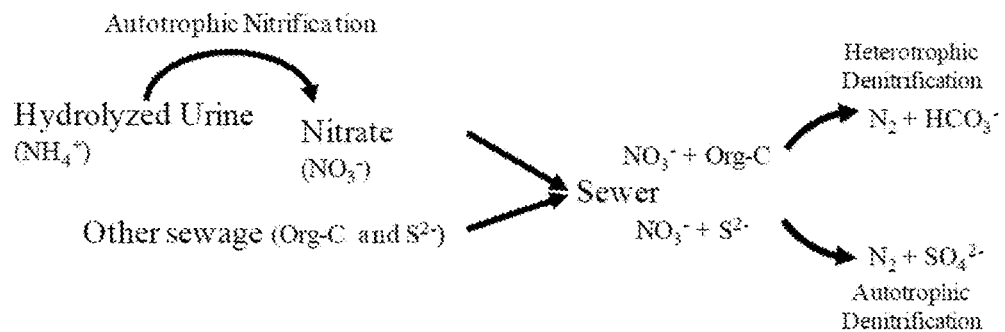
FIG. 3 illustrates a schematic design of the urine nitrification and in-sewer denitrification according to one embodiment of the present subject matter.
Figure 4:
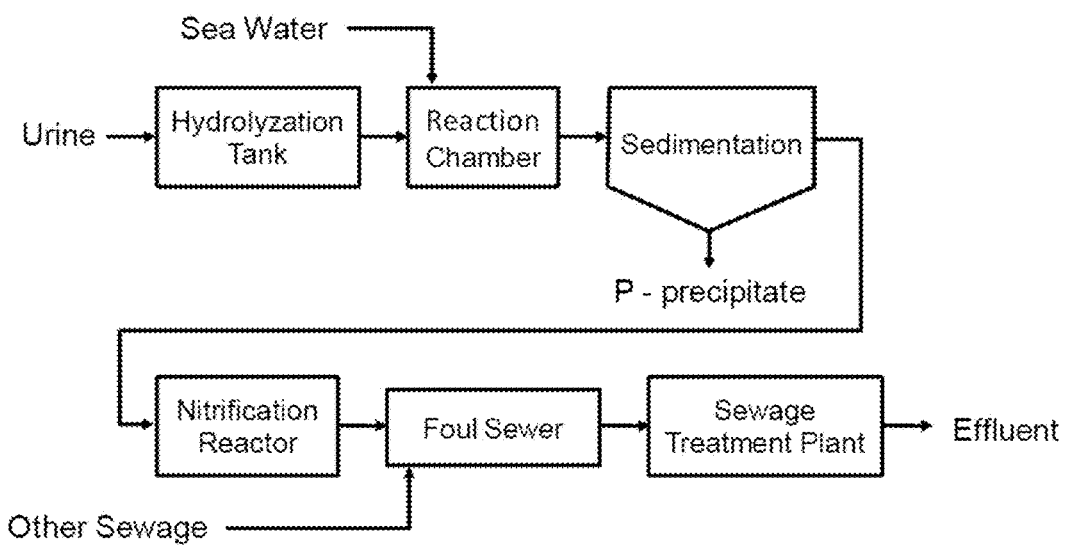
FIG. 4 illustrates a schematic diagram of the complete urine separation, seawater based urine phosphorus recovery, nitrification and in-sewer denitrification system according to one embodiment of the present subject matter.

In the sewer, the nitrate will act as an oxygen source for oxidation of organic carbon to carbon dioxide through heterotrophic denitrification. Where sulfide is present, autotrophic denitrification will occur by converting sulfide to sulfate, which can help to reduce odor problems in the sewers. As the reaction rate for organic carbon oxidation with nitrate is generally about 80% of that with oxygen, and providing that the traveling time is not too short, denitrification would occur before sewage enters the sewage treatment works, which helps to reduce both nitrogen and organic loadings. The reaction of this process is shown in FIG. 3 while the entire seawater based urine phosphorus recovery (SUPR), nitrification and in-sewer denitrification system is shown in FIG. 4.

Benefits

The presently provided method is characterized by the direct use of seawater as a means of control at the source for removal and recovery of phosphorus from urine. In comparison with conventional biological phosphorus removal processes, and also in comparison with other prior urine separation and phosphorus recovery processes, the presently provided method has many benefits. First, conventional phosphorus removal/recovery from wastewater is usually achieved by conventional biological phosphorus removal processes in the wastewater treatment works or through controlled struvite precipitation arising from the supernatant of the anaerobic digester of a biological sewage treatment works. In the presently provided method, phosphorus and nitrogen removal and recovery of phosphorus is achieved through collecting and treating urine separately, before entering the sewage treatment plants.

Also, the present subject matter is distinguished from the prior method where addition of seawater to supernatant of an anaerobic digester is suggested for phosphorus recovery, in the chemicals, processes, pollution control philosophy and microorganism involved. Specifically, digester supernatant is the effluent from an anaerobic digester. It contains high levels of ammonia and phosphate, while urine mixed with domestic wastewater before entering a sewage treatment plant mainly contains urea, $(NH_2)_2CO$, and phosphate. Also, when digester supernatant is mixed with seawater, MAP is readily formed. However, when fresh urine is mixed with seawater, no MAP is formed. Formation of MAP only occurs after urea is biologically hydrolyzed to release ammonia. Further, digester supernatant P-recovery is an "end-of-pipe" process. It is the last step of a biological sewage treatment works.

However, the SUPR in the present subject matter is a "control-at-source" process. It aims at removal and recovery of phosphorus at the source. Furthermore, to apply the digester supernatant phosphorus recovery system effectively, the sewage treatment plant has to employ an anaerobic phosphorus release phase followed by an aerobic phosphorus uptake phase to enable phosphate to be concentrated in the sludge, such that the concentrated phosphate can be released to the supernatant in the anaerobic digester. The specific microorganisms involved are known as Phosphate Accumulating Organisms (PAOs). However, the biological process involved in the present subject matter is the hydrolysis of urea, which can be conducted by many types of microorganisms.

Other urine separation and phosphorus recovery processes known in the art are generally practiced for the purposes of (i) direct reuse through disposal of urine to agricultural land as a fertilizer, or (ii) addition of chemicals such as calcium and magnesium salts for precipitation of phosphorus. With respect to (i), above, the presently provided method nitrifies the urine through a purposely designed biological nitrification reactor and then discharges the nitrified urine into the foul sewer for in-sewer denitrification making use of existing and required sewer infrastructure, reducing nitrogen reduction requirements and organic loading at centralized wastewater treatment plants, thus increasing future organic loading capacity. With respect to (ii), above, the presently provided method makes use of seawater directly as a magnesium source without any addition of chemicals or concentration processes. Seawater is abundant in the coastal area, free of charge and no pretreatment for the seawater is needed. This makes the method completely different from all other urine phosphorus recovery processes. To enhance urine hydrolysis, a suitable biological reactor, such as a biofilm reactor or a continuous stir tank reactor may be used, to reduce the size of the reactor required.

A further advancement of the presently provided method or a system conducting the method is that urine nitrification can be conducted also in a separate reactor, followed by in-sewer denitrification. As the concentration of ammonia is much higher in the urine, this can be achieved in a very small reactor. The nitrified urine will be discharged to the foul sewers and mixed with other wastewater for in-sewer denitrification, instead of conducting denitrification in a sewage treatment works. This will not only eliminate the nitrogen requirement at the downstream treatment works but also provide a reduction in the organic loading, and hence reduction of space requirement for the sewage treatment plant. Such an integrated system has not been reported so far in the art.

Accordingly, the key benefits of the present subject matter are that it can save a lot of energy, chemicals and space to recover phosphorus from sewage, as compared with conventional biological phosphorus removal sewage treatment processes. In comparison with the direct addition of urine into soil as a fertilizer, the key benefits of the present subject matter are that it can avoid the sewage borne pathogens and endocrine disrupter arising from sewage entering the food chain through irrigation, dramatically reduces the volume, and provides a slow release and easy to handle fertilizer.

Together with urine nitrification, the present method can save even much more space and energy as compared to conventional biological treatment works because (a) the nitrogen loading has been significantly reduced, and (b) much of the organic carbon has been removed. Moreover, addition of nitrified urine to the sewer can help to remove and suppress the formation of hydrogen sulfide/odor in the sewer.

EXAMPLES

Example 1: Batch Urine Hydrolysis and Phosphorus Removal Experiment

Urine was collected from a group of 14 healthy male humans between the age of 20 and 36. Freshly collected urine was stored in the refrigerator before the tests. To prepare the fully hydrolyzed urine, the collected urine was stored at room temperature for a prolonged period (about a week or more) to enable hydrolysis to complete.

Fresh urine, fresh urine with a pH adjusted by NaOH to above 9, and fully hydrolyzed urine were mixed with seawater in the ratio of about 1:1 and stirred for 15 minutes for MAP (magnesium ammonium phosphate) precipitation.

Figure 5:
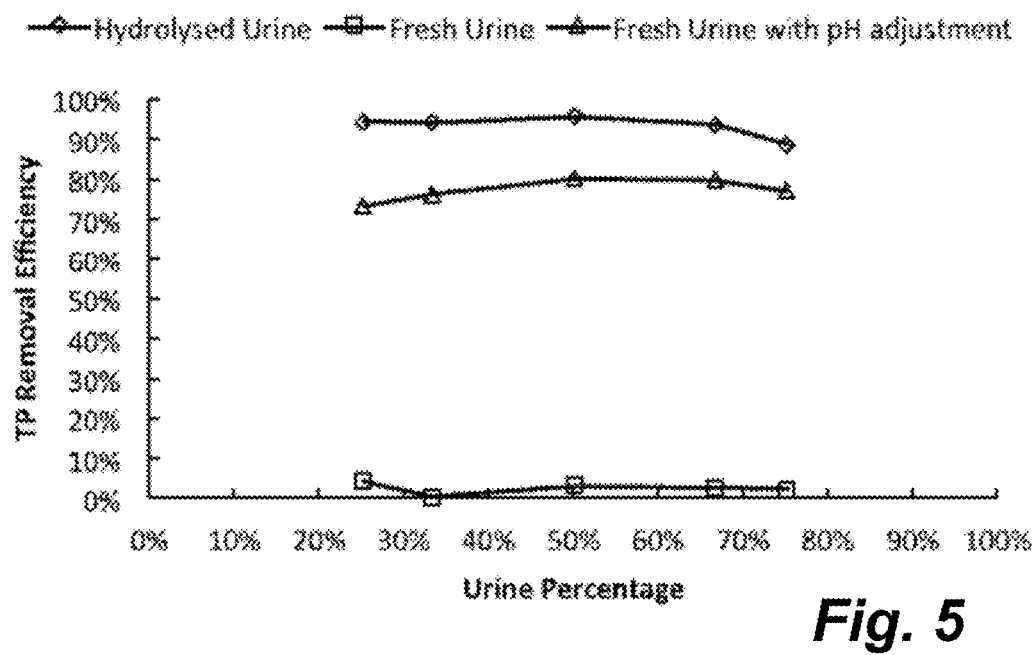
FIG. 5 illustrates total phosphorus removal efficiency in a urine MAP precipitation batch test, where three kinds of urine, i.e., fresh urine with pH 6 (without pH adjustment), fresh urine with pH 9 (pH adjustment by NaOH) and hydrolyzed urine with pH 9 (without pH adjustment) were used.

The total phosphorus removal efficiency obtained from the urine MAP precipitation batch test is shown in FIG. 5. As shown in FIG. 5, the phosphorus removal efficiency increases from less than 5% with fresh urine to about 80% with fresh urine with a pH adjusted by NaOH, and up to 97-98% when the urine is fully hydrolyzed.

Example 2: Seawater-Based Urine Phosphorus Recovery (SUPR) Reactor

Figure 6:
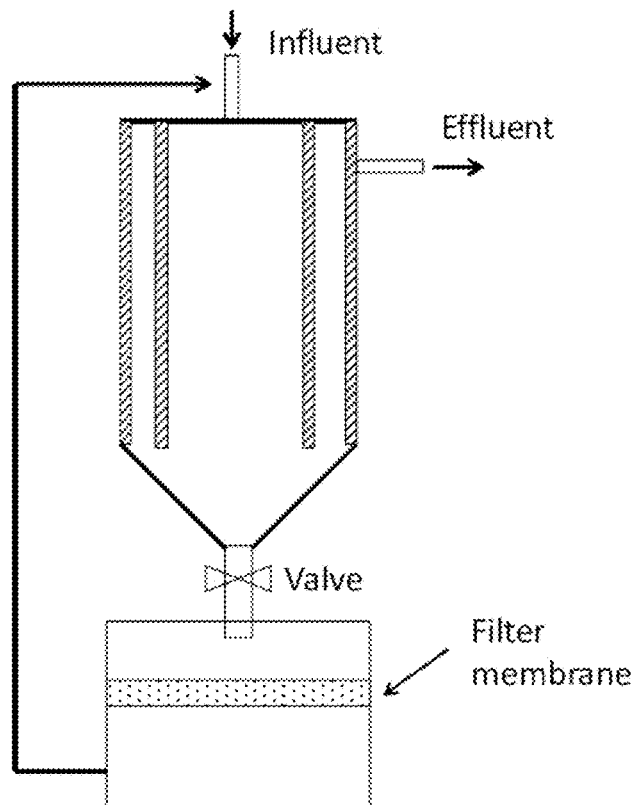
FIG. 6 illustrates an experimental set-up of seawater-based urine phosphorus recovery (SUPR) reactor according to one embodiment of the present subject matter.

FIG. 6 shows the reactor used for simultaneous urine hydrolysis and phosphorus recovery. The reactor has an effective volume of 840 mL and two concentric cylinders. The inner cylinder has a length of 21 cm and diameter of 5 cm, while the outer cylinder has a length of 25 cm and diameter of 7 cm. Urine and seawater mixture, at a ratio of 1:1, was fed into the reactor and recirculated for several days for start-up.

Figure 7:
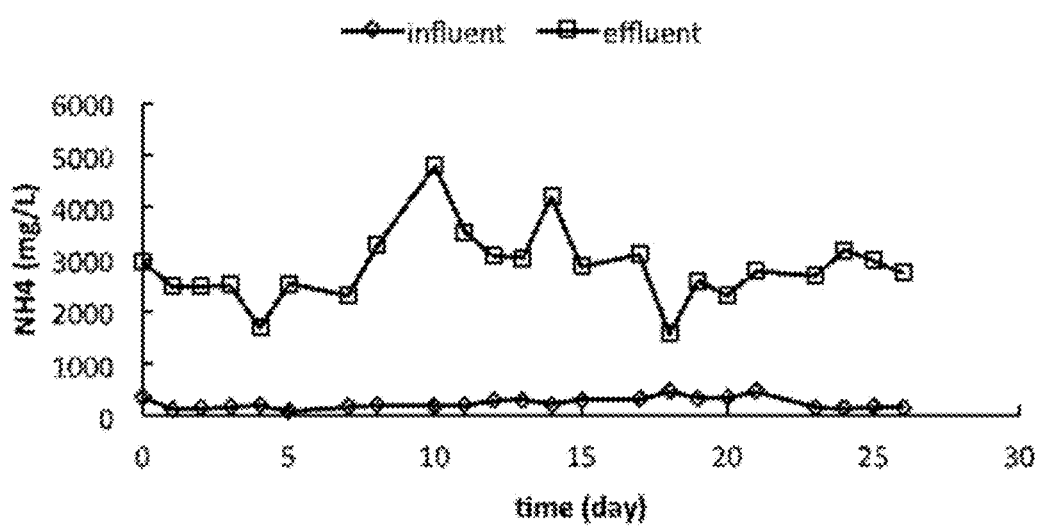
FIG. 7 illustrates the influent and effluent ammonia concentration of the SUPR reactor according to one embodiment of the present subject matter.
Figure 8:
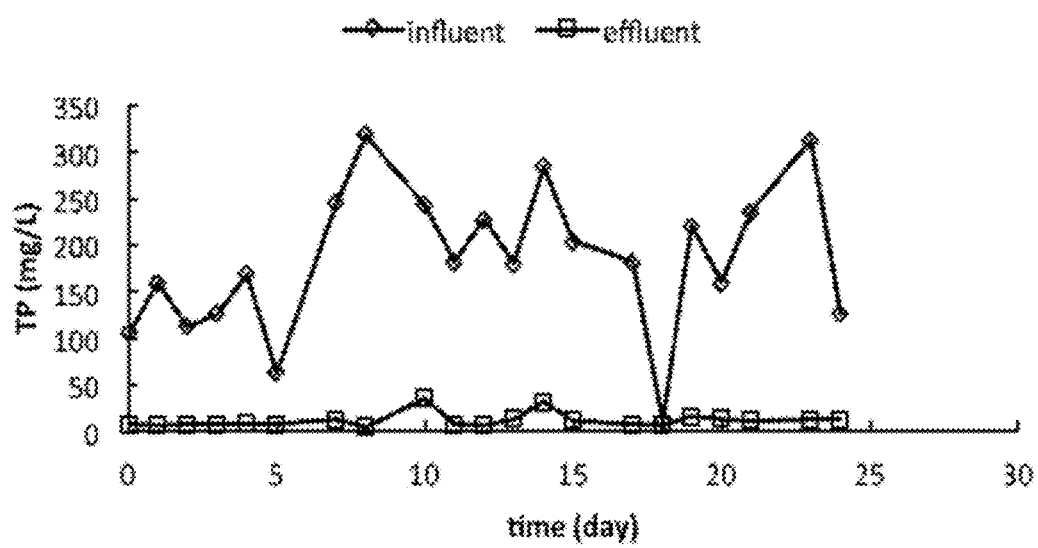
FIG. 8 illustrates the influent and effluent phosphorus concentration of the SUPR Reactor according to one embodiment of the present subject matter.

After the start-up period, the reactor was fed with the urine and seawater mixture, which was stored in the refrigerator at 1-4° C. Operated at room temperature and at a hydraulic retention time (HRT) of 3 hours, MAP and other precipitates were formed at the bottom of the reactor. The bottom valve was opened weekly to release the liquid-solid mixture for collection of the precipitates through the membrane, while the filtrate was then recycled back to the reactor. The influent and effluent ammonia concentration and the Total-phosphorus concentration are shown in FIG. 7 and FIG. 8, respectively. Overall, the average ammonia concentration of influent was 239 mg-N/L and the effluent was 2856 mg-N/L. The effluent TP was 11.5 mg/L and the TP removal efficiency was 94%.

Example 3: Nitrification Following Seawater-Based Urine Phosphorus Recovery

Figure 9:
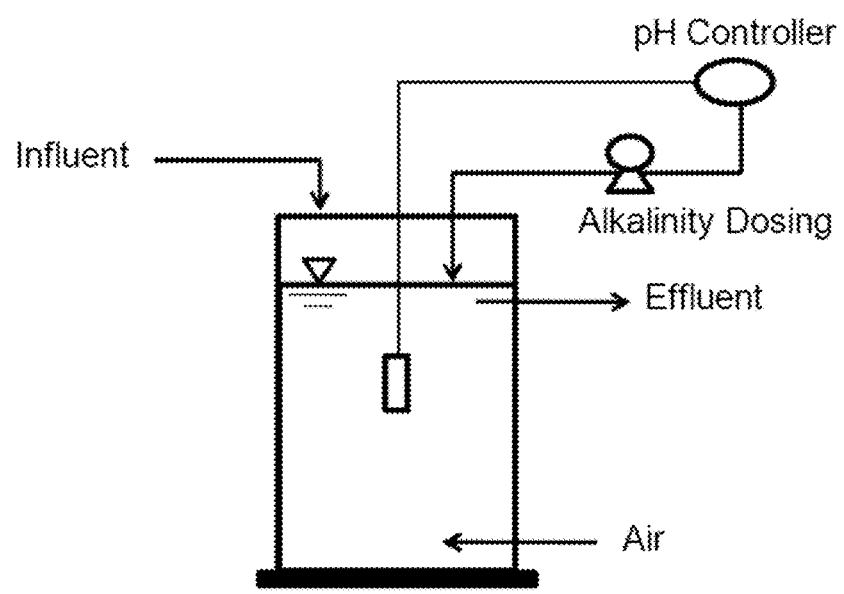
FIG. 9 illustrates a lab-scale sequencing batch reactor (SBR) for urine nitrification according to one embodiment of the present subject matter.

To demonstrate the possibility of urine nitrification following seawater-urine phosphorus precipitation, a sequencing batch reactor with a total volume of 3.9 L (FIG. 9) was constructed. The reactor was seeded with sludge from an activated sludge reactor. An influent comprising of a mixture of hydrolyzed urine and seawater at the ratio of 1:3 followed by struvite precipitation, was used to simulate the actual operation of nitrification after Urine P-Recovery. After an initial start-up period of 160 days, the reactor was fed via a timer 4 times per day before effluent withdrawal with an exchange volume ranging between 50-75%. The mixed liquid pH was controlled by dosing 1 M $NaHCO_3$ through an automatic feeder when pH dropped below pH 6.5.

Since then, the reactor was operated with an average Nitrogen Loading Rate (NLR) of about 800 g-N/m$^3$/day for a prolonged period of 316 days at an average HRT of 1.75 days. The average chloride concentration was 13.2 g/L. Influent total phosphorus and soluble phosphorus concentrations were 2.15 mg-P/L and 0.98 mg-P/L, respectively. At the last 63 days, the reactor was operated at a constant loading rate of 720 g-N/m$^3$/d with average influent total nitrogen, ammonia and nitrate concentrations of 1640 mg-N/L, 1409 mg-$NH_4$-N/L and 0.41 mg-$NO_3$-N/L respectively. The average effluent ammonia and nitrate concentration were 1.96 mg-$NH_4$-N/L and 1234 mg-$NO_3$-N/L, respectively, indicating complete nitrification. Sludge settleability was excellent. The 5-minute sludge volume index was 40 mL/g and the Mean Liquid Suspended Solids (MLSS) was around 6000 mg/L. The data fully demonstrated that urine nitrification process can be performed following the seawater-based urine phosphorus recovery process.

Example 4: In-Sewer Denitrification

Seawater-based Urine Phosphorus Recovery system may result in the discharge of saline sewage to the sewer. To demonstrate the possibility of in-sewer denitrification in the saline environment, a simulation study was conducted in an 8-km long sewage rising main receiving seawater toilet flushed saline sewage in Hong Kong. The rising main was used to convey 1500 m³/h of sewage with a residence time of roughly 5 hours.

Calcium nitrate, a surrogate of nitrified urine, was dosed at an average concentration of 12.3 mg-N/L at a maximum rate of 250 L/h. Samples were collected over a period of 72 hrs at 2 hourly intervals. The results indicated that on average, 92% of the nitrate was removed while 50% of the soluble COD were removed at the same time. The results clearly indicated that in-sewer biological denitrification in the saline environment could be proceeded.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

REFERENCE

Berndtsson, J. C. (2006). Experiences from the implementation of a urine separation system: Goals, planning, reality. *Building and Technology*, 41, 427-437.

Cordell, D., Drangert, J.-O., White, S. (2009) The story of phosphorus: global food security and food for thought. *Global Environmental Change*, 19, 292-305.

Déry, P., Anderson, B. (2007) Peak phosphorus. Energy Bulletin August 13

Fittschen, I., and Hahn, H. H. (1998) Characterization of the municipal wastewater part human urine and a preliminary comparison with liquid cattle excretion. *Water Science and Technology*, 38(6), 9-16.

Hanöus, J., Hellstrom, D., Johansson, E. (1997). A study of a urine separation system in an ecological village in northern Sweden. *Water Science and Technology*, 35(9), 153-160.

Hellstroöm, D., Johansson, E., and Grennberg, K. (1999) Storage of human urine: Acidification as a method to inhibit decomposition of urea. *Ecological Engineering*, 12 (3-4), 253-269.

Jönsson, K (2001). Urine separation—Swedish experiences, in *EcoEng Newsletter*, Issue 1, International Ecological Engineering Society, Wolhusen, Switzerland.

Jönsson, H., Stenström, T.-A., Svensson, J., and Sundin, A. (1997) Source separated urine-nutrient and heavy metal content, water saving and faecal contamination. *Water Science and Technology*, 35(9), 145-152.

Kumarshiro, K., Ishiwatari, H., and Nawamura, Y. (2001) A pilot plant study on using seawater as a magnesium source for struvite precipitation. in: Paper presented at Second International Conference on the Recovery of Phosphorus from Sewage and Animal Wastes, Noordwijkerhout, The Netherlands, 12-13 Mar. 2001.

Lienert, J., Buörki, T., and Escher, B. I. (2007) Reducing micropollutants with source control: Substance flow analysis of 212 pharmaceuticals in faeces and urine. *Water Science and Technology*, 56(5), 87-96.

Maurer, M., Pronk, W., and Larsen, T. A. (2006). Treatment processes for source-separated urine. *Water Research*, 40(17), 3151-3166.

Ronteltap, M., Maurer, M., and Gujer, W. (2007) The behaviour of pharmaceuticals and heavy metals during struvite precipitation in urine. *Water Research*, 41(9), 1859-1868.

US Geological Survey (2010) USGS 2010 Mineral commodity summaries. Digital Data Series DDS-37. http://minerals.usgs.gov/minerals/pubs/mcs/ (accessed 12 Mar. 2011).

Van Vuuren, D. P., Bouwman, A. F., Beusen, A. H. W. (2010) Phosphorus demand for the 1970-2100 period: A scenario analysis of resource depletion. *Global Environmental Change*, 20, 428-439.

Etter (2009) Struvite recovery from urine at community scale in Nepal. Intermediate report. Submitted to EPFL by STUN/EAWAG Lee et al. (2003) Removal of nitrogen and phosphate from wastewater by addition of bittern. *Chemosphere*, 51 (4), pp. 265-271.

We claim:

1. A method for wastewater treatment providing phosphorus recovery from urine, comprising:
   (a) collecting urine or urine mixed with flushwater, separate from wastewater not used for said collecting said urine or urine mixed with flushwater, for pretreatment,
   (b) introducing seawater to the collected urine or urine mixed with flushwater;
   (c) at least after introducing the seawater, using a biological hydrolysis reactor to biologically hydrolyze urea in the urine to release ammonia from the urine and increase pH, causing precipitation of phosphorus;
   (d) obtaining a low-phosphate ammonia-rich supernatant as an effluent from the biological hydrolysis reactor;
   (e) nitrifying the urine by nitrifying the ammonia hydrolyzed from the urine to nitrate and/or nitrite using a biological nitrification reactor;
   (f) removing nitrogen from the nitrified urine comprising discharging nitrified urine to a foul sewer to mix with the other wastewater for in-sewer denitrification and organic carbon removal; and
   (g) discharging the low-phosphate ammonia-rich supernatant to a foul sewer for further wastewater treatment and, after discharging to the foul sewer, applying wastewater treatment to the phosphorus-removed urine to mix with other wastewater, thereby reducing phosphorus loading of domestic sewage in the further wastewater treatment.

2. The method of claim 1, wherein the biological reactor comprises a biofilm reactor.

3. The method of claim 2, wherein the biofilm reactor comprises a fixed biomass producing urease.

4. The method of claim 1 wherein the hydrolysis comprises allowing rapid hydrolysis of urine to a degree corresponding to a pH of about 8.9 or above.

5. The method of claim 1, wherein the removal of phosphorus comprises recovery of phosphorus in the form of magnesium ammonium phosphate (MAP) or struvite.

6. A method for wastewater treatment providing phosphorus recovery from urine, comprising:
   (a) collecting urine or urine mixed with flushwater, separate from wastewater not used for said collecting said urine or urine mixed with flushwater, for pretreatment,
   (b) introducing seawater to the collected urine or urine mixed with flushwater;
   (c) at least after introducing the seawater, using a biological hydrolysis reactor to biologically hydrolyze urea in the urine to release ammonia from the urine and increase pH, causing precipitation of phosphorus;

(d) obtaining a low-phosphate ammonia-rich supernatant as an effluent from the biological hydrolysis reactor;
(e) oxidizing nitrogen from the urine;
(f) nitrifying the urine by nitrifying the ammonia hydrolyzed from the urine to nitrate and/or nitrite using a biological nitrification reactor;
(g) removing nitrogen from the nitrified urine comprising discharging nitrified urine to a foul sewer to mix with the other wastewater for in-sewer denitrification and organic carbon removal; and
(h) discharging the phosphorus-removed and the nitrogen-oxidized urine to a foul sewer, enabling further wastewater treatment and, after discharging to the foul sewer, applying wastewater treatment to the phosphorus-removed urine to mix with other wastewater to achieve organic carbon removal, thereby reducing phosphorus loading of domestic sewage in the further wastewater treatment.

7. The method of claim 6, wherein the biological reactor comprises a biofilm reactor.

8. The method of claim 7, wherein the biofilm reactor comprises a fixed biomass producing urease.

9. The method of claim 6 wherein the hydrolysis comprises allowing rapid hydrolysis of urine to a degree corresponding to a pH of about 8.9 or above.

10. The method of claim 6, wherein the removal of phosphorus comprises recovery of phosphorus in the form of magnesium ammonium phosphate (MAP) or struvite.

11. A method for wastewater treatment providing phosphorus recovery from urine, comprising:
    (a) collecting urine or urine mixed with flushwater, separate from wastewater not used for said collecting said urine or urine mixed with flushwater, for pretreatment,
    (b) introducing seawater to the collected urine or urine mixed with flushwater;
    (c) at least after introducing the seawater, using a biological hydrolysis reactor to biologically hydrolyze urea in the urine to release ammonia from the urine and increasing pH, causing precipitation of phosphorus;
    (d) obtaining a low-phosphate ammonia-rich supernatant as an effluent from the biological hydrolysis reactor; and
    (e) discharging the phosphorus-removed urine to a foul sewer for further wastewater treatment and, after discharging to the foul sewer, applying wastewater treatment to the phosphorus-removed urine to mix with other wastewater to achieve in-sewer denitrification and organic carbon removal while reducing phosphorus loading of domestic sewage in the further wastewater treatment.

12. The method of claim 11, wherein the removal of phosphorus comprises recovery of phosphorus in the form of magnesium ammonium phosphate (MAP) or struvite.

* * * * *